2,456,192

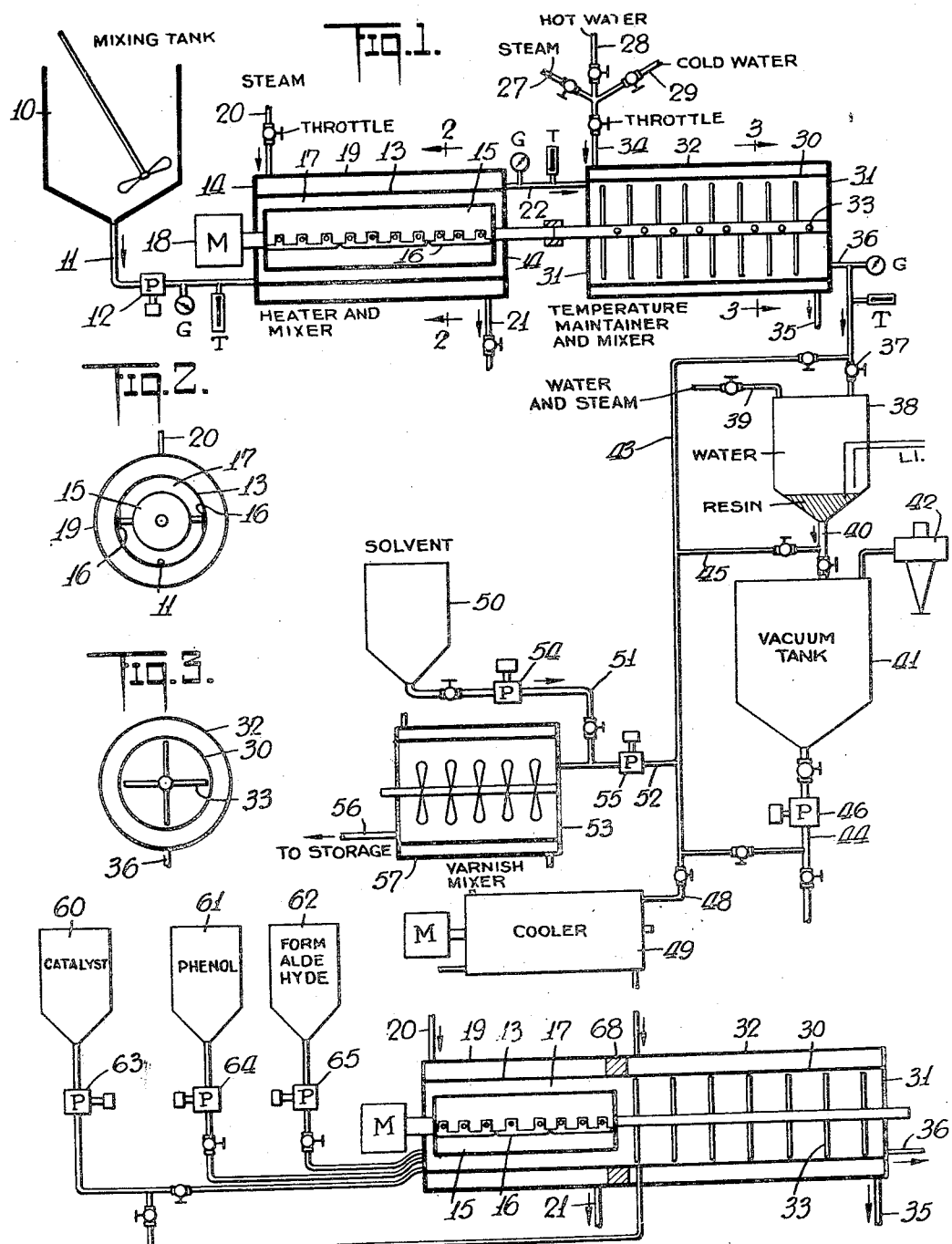
Dec. 14, 1948. H. G. HOULTON 2,456,192
CONTINUOUS PROCESS FOR THE MANUFACTURE OF SYNTHETIC RESINS
Filed Sept. 13, 1943
INVENTOR
Harold G. Houlton
BY
Dean, Fairbank & Hirsch
ATTORNEYS Patented Dec. 14, 1948

UNITED STATES PATENT OFFICE 2,456,192

CONTINUOUS PROCESS FOR THE MANUFACTURE OF SYNTHETIC RESINS

Harold G. Houlton, Louisville, Ky., assignor to The Girdler Corporation, Louisville, Ky., a corporation of Delaware Application September 13, 1943, Serial No. 502,102

6 Claims. (Cl. 260—57)

In the manufacture of various kinds of synthetic resins of the type which requires heat to effect the reaction between the ingredients or reactants, said reaction may be carried only to the point at which the resin is soluble in suitable volatile solvents or it may be carried further to the point where the resin is insoluble in said solvents and infusible. For many uses, it is important that the reaction be stopped before the insoluble or infusible state is reached and when the reaction has proceeded to a definite and accurately determined end point, although in the later use of the resin, the reaction may be carried to completion.

With most such resins the rate of reaction of the ingredients increases with increase in temperature and therefore from the standpoint of economy in time and in the use of the apparatus employed, it is customary to effect the reaction at as high a temperature as is found to be practical. In the commonly employed batch type process, this requires extreme accuracy of control and constant checking of the characteristics of the product during the heating so that the reaction may be stopped at the right point, and also requires a very rapid cooling to check or stop the reaction when that end point has been reached. In the case of phenolic resins the water is evaporated under vacuum while still in the kettle and after the resin has been cooked nearly to the desired end point. The resin may then be further cooked to complete the desired reaction.

Such accuracy of control is difficult to achieve with a batch process and in commercial production there may be considerable variation in the specific properties of the product due to variation in the time and temperature of heating and the rapidity of cooling, even though a skilled operator gives the cooking his almost constant attention.

Also, with a batch process the sudden checking or stopping of the reaction at the desired end point of the cook usually is effected by dumping the charge onto the floor or into large shallow pans. Such dumping cannot be instantaneous from a large commercial kettle such as is usually employed in the conventional batch processes, and therefore some parts of the charge will be cooled sooner or more rapidly than other parts. Portions of the charge adhere to the walls of the kettle and must be dissolved or scraped off before a new batch can be started. Such portions may have been carried to the insoluble and infusible state. In the manufacture of varnishes, a cold solvent may be dumped into the kettle. In this case the sensible heat of the resin is converted into latent heat of vaporization of the solvent, the vapors of which are condensed and returned. The solvent temperature as well as the time of cooling may vary.

In spite of these and other objections to batch processes, no continuous process affording accuracy of control and uniformity of result has ever been adopted commercially in this art so far as I am advised, although a continuous process has been proposed, as for instance, in the Turkington Patent 1,660 403, issued February 28, 1928.

The main objects of the present invention are to secure higher speed of production, more accurate control of the reaction, a more uniform product, greater efficiency, less loss of ingredients, greater output for a given size of apparatus, and less material in process and which may be ruined if anything goes wrong in the operation.

Although my invention may be employed in the production of a wide variety of synthetic resins of the type above referred to, the following description will deal more particularly with those resins of the phenol formaldehyde type. In this type, various kinds of phenolic bodies, either in the refined or crude state, such as phenols, cresols, cresylic acid, etc., are reacted with a hardening agent, such as formaldehyde or the like, and a catalyst of either the basic or acidic type, such as ammonia or hydrochloric acid is employed.

In carrying out my invention, the process is a continuous one in which there are several essential steps which may be performed in separate units of the required characteristics, which may be in separate pieces of apparatus or in certain cases in direct sequence in a single piece of apparatus. In the first step the mixed ingredients are rapidly heated in a comparatively thin layer while being vigorously agitated and forced at a rapid rate through the first unit and held under such a pressure as will prevent volatilization of any of the ingredients or any products of the reaction. The rapidity of flow and the rapidity of the increase in temperature are so coordinated for the specific ingredients employed or their specific relative proportions that the desired high temperature of reaction is reached as the mixture leaves the first unit, but very little, if any, time is afforded for the reaction to proceed in such first unit or section.

In the second step, the temperature is controlled and may be held substantially constant in the second unit, preferably by the action of a temperature controlling fluid which is at such temperature and circulated at such a rate as to remove promptly substantially all exothermic heat of reaction not lost by radiation, or to keep the mixture at the proper reaction temperature if it be of the endothermic type.

The size of the second unit is coordinated to the size of the first unit, the speed of the flow of the material into and out of this second unit, and the rapidity of reaction at the selected temperature under which it is maintained, so that the reaction will have progressed to the desired degree and the selected end point for the reaction will have been reached at the instant the material reaches the outlet of this second unit. The reaction is then substantially instantaneously stopped as the material discharges from this unit.

Water may be a part of one or more of the ingredients used and may be also produced in the reaction. This is kept in liquid form in both of the units by reason of the pressure employed, even though the temperature may be 300° F. or higher.

A third step is essential for those resins, such as phenol-formaldehyde resins, which separate rapidly into two phases. This step is the pressure separation of the two materials, i. e., resin and aqueous solution. This separation may be effected by providing at the outlet end of the second mixer unit, a suitable tank in which the resin settles to the bottom and may be continuously withdrawn while the aqueous solution forms a layer over the resin and may be continuously withdrawn from the tank through a suitable pressure controlled valve. A certain degree of polymerization occurs in the tank during the formation of the resin layer therein and it is therefore necessary to provide the tank with a level indicator to have an accurate control of the degree of polymerization occurring therein. This result may also be accomplished by a number of other methods such as by holding the water level in the tank just above the resin-outlet valve, so that a small quantity of water flashes out of the tank with the resin.

As an important feature of the invention, when producing homogeneous resin solutions which do not separate into two layers, the mixture leaving the second unit under pressure and at high temperature flows through a reducing valve or orifice where the pressure suddenly drops to a relatively low one. The reaction products may be delivered to an atmospheric or vacuum separator where a portion at least of the volatile constituents pass to vapor form and leave the resin. The vaporizing absorbs heat from the resin and almost instantly cools it to 212° F. or lower, at which temperature the reaction will proceed extremely slowly, if at all.

When producing non-homogeneous resin solutions which separate into two layers on leaving the second unit, the material may be passed through a pressure separator as described above, followed by permitting it to flash to atmospheric pressure or by passing it into a vacuum tank to stop the reaction.

In using apparatus designed and assembled for carrying out the invention, the characteristics of the particular ingredients used including the speed of heating of the mixture, the desired end point for the reaction and the time and temperature required to carry the reaction to that end point may be determined by laboratory test, and the speed of the pump or pumps which force the material through the units may be so set as to insure that the material will be in the second unit for just the right time to complete the reaction to the desired end point while moving through this unit and at the temperature selected. The operator, knowing the relative capacities of the two units, will know how long the material will take to get through the first unit when traveling at the speed required to retain it in the second unit for the desired reaction period. Knowing how long the material will remain in the first unit, he can readily determine the temperature and rapidity of flow of the temperature changing fluid of the first unit which will be required to bring the ingredients up to the temperature at which it is desired to maintain the material in the second unit. Thus by selecting units of approximately the correct relative volumes and adjusting the pump speed and jacket liquid temperature, a continuous high speed production of a uniform product may be obtained.

The details of construction of the various units and other apparatus parts employed constitute no portion of my invention as these units and apparatus parts may be of standard design.

In these drawings,

Fig. 1 is a diagram showing units which may be employed and how they may be connected up to carry out the invention;

Figs. 2 and 3 are transverse sections on the lines 2—2 and 3—3 respectively, of Fig. 1;

Fig. 4 is a somewhat diagrammatic showing of an apparatus in which the two main units are combined in a single piece of apparatus, and in which the materials are not premixed before entering the first unit.

In carrying out the process by the use of the type of apparatus illustrated in Figs. 1, 2 and 3, the ingredients are delivered continuously or intermittently to a mixing tank 10. As an example, these materials may be in the relative proportions of 51 parts of cresylic acid, 44 parts of formalin containing 37% of formaldehyde, and 5.7 parts of aqua ammonia containing 28% of ammonia.

The mixing may be at atmospheric pressure and the mixture may be delivered through a pipe 11 to a pump 12 and forced by the latter into the combined heater and mixer. This may be a cylindrical chamber having a peripheral wall 13 and end walls 14 and provided with an agitator having a relatively large shaft or core 15 carrying scraping blades 16 acting on the peripheral wall and preventing local overheating. The core may be of such size in respect to the peripheral wall 13 that there is only a comparatively thin annular space 17 in which the scrapers agitate the mixture during the heating and rapidly remove films forming on the peripheral heat transfer wall.

This agitator may be driven at relatively high speed in any suitable manner, as for instance by a motor 18, and the heating may be effected in any suitable manner, as for instance by a temperature changing medium circulated in a jacket 19 having a controllable inlet 20 at one end and a controllable outlet 21 at the other.

The pump may put the mixture under a pressure of 200 pounds per square inch, but this pressure will depend upon the degree of heating and the character of the materials employed. It should be such as will prevent vaporizing or internal flashing of volatile constituents. The capacity of the chamber, the capacity and speed of the pump 12, the temperature of the temperature changing medium, and the rate of flow of the latter should be so coordinated that when the material leaves the chamber through the pipe 22, it will have been brought to the preselected temperature at which the rate of reaction will be rapid.

There will be comparatively little reaction between the ingredients at atmospheric temperature, and the speed of reaction will increase as the temperature rises. The temperature of the heating medium and the rate of its flow may be such that the material which entered the first unit at room temperature may leave the unit through the pipe 22 at about 300° F. but will be in the unit for such a short time that only a small amount of the reaction may have taken place. This might be 10% and in some cases as high as 25%. The pressure and temperature may be noted by pressure gauges G and the thermometers T at the entrance and exit ends of the first unit, and the speed of the pump and flow of the temperature changing medium may be adjusted to control the operation and keep the reaction within the desired limits.

The temperature changing medium circulated in the jacket is preferably steam, although other suitable fluid might be employed and the inlet and outlet pipes 20 and 21 may be provided with valves for controlling the flow and the back pressure. The capacity of the first or heater unit is comparatively small in respect to the second or reactor unit, and the speed of flow of the material may be such that it remains in the first unit only 5 to 50 seconds. This will be high for a large capacity unit and slower flow of heating medium and will be low for small capacity unit and fast flow of heating medium. A very short time is desirable to keep the amount of reaction in the first unit very low for proper control of the process.

The heated mixture under the pressure of for instance 200 pounds per square inch, and a temperature of for instance 300° F. and delivered through the pipe 22, is conducted to the second unit which is preferably in the form of a chamber having a peripheral wall 30, end walls 31, and a jacket 32 through which a temperature changing medium may be circulated from an inlet pipe 34 at one end to an outlet pipe 35 at the other. In this chamber there is provided an agitator 33 which may be of any suitable character, for instance it may have a central shaft with radiating pins. The two units may be in axial alignment and relatively close together so that the shafts thereof may be coupled together and driven by the same motor.

The material in the second unit is preferably maintained at a substantially constant temperature and the capacity of the chamber is such in respect to the rate of inflow through the pipe 22 and the corresponding flow through an outlet pipe 36, that the reaction will have progressed to the desired point by the time the material reaches this outlet. In some cases mechanical agitation in the second unit may not be needed because stationary baffles or other means in the path of flow may be such as will give a turbulent flow to the material undergoing reaction and will permit temperature maintenance without local overheating or the development of excessive pressure due to high viscosity. In some cases the exothermic heat produced in the second unit may be used to heat up the mixture in or on the way to the first unit, or in some cases it may be equal to the radiation losses so that no circulation of temperature changing medium is required for the second unit.

As illustrated, the inlet pipe 34 is provided with a branch 27 for steam, a branch 28 for hot water, and a branch 29 for cold water, so that by controlling the relative proportions of these ingredients and the rate of flow through the jacket, the desired temperature may be maintained in the second unit. It is not essential in all cases that the temperature be maintained absolutely constant in the second unit, but it should be controlled so that the reaction will have reached the desired end point when the material reaches the outlet 36. The chamber of the second unit may be two or three times as big as that of the first unit, but here again capacity and rate of reaction and temperature must be properly coordinated. In other words, with a very large chamber the temperature should be maintained substantially below that at which a small chamber would be maintained, because the hotter the mixture, the more rapid is the rate of reaction.

If the material goes into the second unit at 280° or 300° F. and comes out at 400° F., the chamber will necessarily have to be very much smaller or the rate of throughput very much greater than would be the case where the material went in and came out at 280 or 300° F. The control of the speed of the pump 12 and the flow or temperature of the temperature changing medium will have to be in a narrower range, the higher the temperature which is maintained in the second unit, but the higher the temperature maintained in this unit the greater will be the rate of production of an apparatus of a given size.

The material leaving through the outlet 36 will ordinarily have been reacted to a point just short of gelling and where further heating or further maintenance at the high temperature will convert the resin to the insoluble or infusible state, if the resin be that type. The material still under the high pressure which prevents internal flashing or vaporization is discharged from the pipe 36 through a valve 37 into a separator tank 38 in which the pressure may be substantially above atmospheric or it may be under a partial vacuum. The sudden drop in pressure permits at least a substantial part of the water which was delivered as a part of the formalin and as a part of the aqua ammonia, and that produced by the reaction, to separate or flash into steam and pass off, leaving the resin and unevaporated water in the tank 38 where the temperature will be not over 212° F. and where the water and resin may separate by gravity. By using a low pressure flash tank 38 at the discharge end of the second unit, the temperature drop and the removal of most of the volatile matter is effected without the expenditure of outside energy.

As previously noted, the rate of reaction at 212° F. is very slow and therefore the reaction which was progressing at a relatively high rate in the second or reactor unit, will be almost instantly stopped or slowed down to such an extent that little further reaction takes place during further cooling to atmospheric temperature.

The tank 38 may be open to the atmosphere so that most of the water may flash off to the atmosphere, or it may be substantially closed and provided with an outlet pipe 39 having a spring pressed valve which will keep the pressure above atmospheric and let steam and water escape, or the tank may be connected to a source of subatmospheric pressure so that a partial vacuum may be maintained in the tank and substantially all of the water removed as steam or vapor.

Such water as remains in the tank in liquid form will separate as an upper layer, and the lower resin layer may be continuously drawn off through a pipe 40. The resin is kept low by controlling the rate of draw-off of the resin. The tank may have a level indicator L. I. with electrode terminals vertically spaced to a short distance and with one in the water and the other in the resin so that the electric current flow will be stopped if the resin level rises above the upper electrode and will reach a maximum when the resin level is below the lower electrode.

This resin may contain some residual water, ammonia, formaldehyde and other volatile ingredients and these may be removed by delivering from the pipe 40 to a vacuum tank 41 in which a vacuum is maintained of any desired degree by any suitable means such as a vacuum ejector 42. With some types of resin, and particularly if it contains no water or other volatile ingredients, the product may be drawn from the pipe 36 through pipes 43 and 44 and delivered to a storage tank. In other cases the resin, after separation from most of the water may be drawn off from the pipe 40 and delivered through pipe 45 to the pipe 44 leading to storage, and in other cases the resin may be withdrawn from the vacuum tank by a pump 46 and delivered through pipe 44 to storage.

The resin from pipe 43 or pipe 45 or pipe 44 may be delivered through a pipe 48 to a cooler 49 before going to storage. This cooler may be, and preferably is, of the high speed agitator type similar to or identical with the first unit above described. In case it is desired to add other ingredients or to add solvent and make a varnish, there may be provided a solvent tank 50 connected by a pipe 51 to a pipe 52 leading from the pipes 43, 45 or 44 to a mixer 53. In the pipes 51 and 52 there may be pumps 54 and 55 so that the proper relative quantities of the resin and the solvent may be mixed to form a varnish or other liquid product. The mixer 53 may be of any suitable character and provided with any suitable agitator, and the finished liquid product may be drawn off through the pipe 56 and delivered to storage. The mixer 53 is preferably provided with a jacket 57 for a heating medium so that the solvent may be raised to such a temperature as will facilitate rapid dissolving of the resin, but the heat of reaction of the resin may be sufficient and the resin may be cooled by the action of the solvent, and the varnish delivered from the mixer 53 may be at atmospheric temperature or even somewhat above.

In the drawing there has been no attempt to illustrate minor details of the apparatus, but it will be understood that all of the parts through which the mixture or resin pass at a temperature above that of the atmosphere may be properly insulated to prevent undesired heat loss.

In an apparatus in which the material remains in the first or heater unit only 20 to 50 seconds, it may remain in the second or reactor unit only about two minutes, and if the second unit has a capacity of 100 pounds of resin, the flow through may be at the rate of 50 pounds per minute and the apparatus may produce 3,000 pounds of resin per hour.

As indicating the extent to which the apparatus may be varied, attention is called to Fig. 4 in which the catalyst, the phenol and the formaldehyde are stored in separate tanks 60, 61 and 62 and delivered by separate pumps 63, 64 and 65 to the heater and mixer unit. In this case all of the mixing is effected in the first unit instead of there being a preliminary mixing in a mixing tank such as the tank 10 of Fig. 1. The speed of the pumps may be varied to deliver the ingredients in proper relative proportions or the pumps may be operated at a higher speed and the flow to the unit controlled by metering valves and the excess returned to the pump inlet or to the supply tank.

Inasmuch as very little of the reaction takes place in the first unit, the presence of catalyst in the mixture at this time is not objectionable but if desired, all or any desired part of the catalyst may be by-passed around the first unit through a pipe 67 and joined with the other two ingredients at the inlet to the second unit, so as to delay or prevent any reaction until after the mixture has been brought up to the desired temperature.

As previously indicated, the two units may be combined in a single piece of apparatus. In Fig. 4, I have shown a single chamber with the agitators of both units mounted on a single shaft and with a single jacket divided into two sections by a partition 68 preferably of insulating material so that separate fluids may circulate in the jackets around the agitators. This has the advantage of reducing the number of shaft packings and bearings and eliminating resistance to flow from one unit to the other.

If the chamber shown in Fig. 4 has an internal diameter of 3 inches, the shaft or core in the first unit may be 2½ inches in diameter, leaving an annular space of ¼ inch and the shaft in the second unit may be 1¼ inches, leaving a radial distance of ⅞ inch from the shaft to the peripheral wall. The relative lengths of the two types of agitators shown in Fig. 4 and the location of the partition 68 in the jacket may be varied, depending upon the time permitted for bringing the material up to the desired reaction temperature and the time required for the substantial completion of the desired reaction at that temperature. As previously noted, the main portion of the reaction; that is, from 75 to 90% of it, will ordinarily take place in the second unit and only 10 to 25% will take place in the first unit where the material is being brought up to the desired reaction temperature. Obviously, the same type of agitator may be employed in the second unit as in the first, but in order to provide the desired difference in relative capacities of the two units, this might require the second unit to be undesirably long.

In carrying out the invention I approach as near as practical to instantaneous heating to a predetermined reaction temperature, hold the mixture at that temperature for a predetermined time to get a predetermined degree of reaction, and then approach as near as possible to instantaneous chilling to effect substantially instantaneous stopping of the reaction.

In carrying out the invention, one is not bothered about the small amount of reaction which takes place in the first zone, as the reacting materials are in the first zone for such a short period of time, and are not up to the rapidly reacting temperature until just before they leave the first zone. The reaction is accurately controlled because the reactants are held at a fixed temperature for a fixed period of time, and this temperature and time period may be readily controlled at will by the throttling of the temperature changing medium and the speed of the pump forcing the material through said second zone.

A wide variety of catalysts may be employed. If the catalyst be acidic, the resin may not pass to the insoluble stage, even on prolonged heating, but the heating in the second unit will be such as to give the product the desired viscosity. Various other hardening agents for the phenolic body may be used in place of formaldehyde. The process may be used for making a wide variety of other resins from appropriate reactants, such as urea formaldehyde condensation products, alkyds, and others.

The reaction proceeds at an appreciably faster rate when an acidic catalyst, such as hydrochloric acid or sulphuric acid, is employed rather than certain basic catalysts. This fact must be considered in operating the second and third units described herein.

In general, the operation of the above described process and apparatus will depend upon the type of resin being produced and the purpose for which the resin is to be used. For example, when producing a phenol-formaldehyde water-soluble laminating varnish, the use of the pressure separator 38 is not necessary. While, if the moisture content of the resinous solution is satisfactory for use as a bonding agent for laminated material, the solution may be directly passed to cooler 49. However, if the moisture content of the resinous solution is too high, the solution may be passed into tank 41 which may be at atmospheric or lower pressure, and it could then be passed through cooler 49. The procedure outlined above for the production of the phenol-formaldehyde water-soluble laminating varnish is also applicable to the processing of other materials such as urea-formaldehyde resinous syrup.

In the production of spirit soluble varnish in accordance with the present invention, the molten resin leaving the separator tank 38 through the line 45 or through the vacuum tank 41 for further drying, is passed into the varnish mixer 53 and solvent from tank 50 is admixed therewith until a homogeneous solution is obtained. The varnish thus obtained may be passed through pipe 56 to a suitable storage receptacle.

Having thus described my invention, what I claim as new and desire to secure by Letters Patent is:

1. The continuous process of making a synthetic resin which includes the steps of continuously and rapidly passing a stream of a mixture of resin forming ingredients comprising formaldehyde and a phenolic body through one zone in the form of a thin confined layer and while in said zone vigorously mechanically agitating the mixture and rapidly heating it uniformly throughout the cross-section thereof to a predetermined temperature of incipient rapid reaction, passing the mixture with agitation through a second zone maintained at a substantially constant temperature and at such a rate that at the terminal of the second zone the reaction has proceeded to a point just short of gelling, maintaining the mixture in both said zones under pressure sufficient to keep all of the constituents of said mixture in liquid form, and then stopping the reaction by discharging the resin to a lower pressure whereby volatilization of volatile ingredients reduces the temperature.

2. The continuous process of making a synthetic resin of the type which requires heat to effect reaction between a plurality of resin forming constituents to produce the resin, and wherein there is an increase in the reaction rate with increase in temperature, which process includes the steps of rapidly and continuously flowing a mixture of the resin forming constituents as a confined stream of relatively small transverse cross-section through a first zone, vigorously mechanically agitating said stream in said zone while heating the stream in said zone to effect extremely rapid increase in temperature of said resin forming constituents to a temperature of incipient rapid reaction and maintaining substantially uniform temperature throughout each transverse cross-section of said stream in said zone, continuously flowing the heated mixture of resin forming constituents from said zone into and through a second zone, causing said mixture to flow as a turbulent stream through said second zone while controlling the temperature of said mixture in said second zone to thereby limit the rate of rise in temperature of said mixture in said second zone to a rate substantially less than the rate of temperature rise in said first zone and to allow said mixture of resin forming constituents to attain in said second zone a predetermined desired state of completion of reaction, maintaining the mixture in both said zones under pressure sufficient to keep all of the constituents of said mixture in liquid form, and cooling said mixture so as substantially completely to stop the reaction of said constituents substantially as soon as said mixture has attained said predetermined desired state of completion of reaction.

3. The process defined in claim 2 in which the temperature of the stream of resin forming constituents in the second zone is maintained substantially constant throughout the passage of said stream through said second zone.

4. The process defined in claim 2 in which a catalyst is present in the mixture of the resin forming constituents passing through said first zone.

5. The process defined in claim 2 in which a catalyst is introduced into the stream of said resin forming constituents as said stream enters said second zone.

6. The process defined in claim 2 in which the second zone is substantially larger than said first zone and the mixture of resin forming constituents remains in said second zone substantially longer than in said first zone.

HAROLD G. HOULTON.

REFERENCES CITED

The following references are of record in the file of this patent:

UNITED STATES PATENTS

| Number | Name | Date |
|---|---|---|
| 1,660,403 | Turkington | Feb. 28, 1928 |
| 2,068,479 | Bowen et al. | Jan. 19, 1937 |
| 2,090,586 | Ward | Aug. 17, 1937 |
| 2,375,256 | Soday | May 8, 1945 |

OTHER REFERENCES

Ellis, Chemistry of Synthetic Resins, vol. 1, page 286 (1935).

McHutchison, Industrial Chemist, Oct. 1934, pages 383-386.